United States Patent
Funken et al.

(10) Patent No.: US 7,047,623 B2
(45) Date of Patent: May 23, 2006

(54) DEVICE FOR INSTALLING A LINEAR MOTOR LINE

(75) Inventors: Peter Funken, Frechen (DE); Christian Rosin, Reichling (DE)

(73) Assignees: Thyssenkrupp Transrapid GmbH, Kassel (DE); NKT Cables GmbH, Cologne (DE)

( * ) Notice: Subject to any disclaimer, the term of this patent is extended or adjusted under 35 U.S.C. 154(b) by 107 days.

(21) Appl. No.: 10/220,698

(22) PCT Filed: Feb. 6, 2001

(86) PCT No.: PCT/EP01/01254

§ 371 (c)(1),
(2), (4) Date: Sep. 3, 2002

(87) PCT Pub. No.: WO01/67583

PCT Pub. Date: Sep. 13, 2001

(65) Prior Publication Data

US 2003/0029025 A1    Feb. 13, 2003

(30) Foreign Application Priority Data

Mar. 9, 2000    (DE) ................................ 100 11 117

(51) Int. Cl.
*H02K 15/00* (2006.01)
*H02K 15/14* (2006.01)
*H02K 15/16* (2006.01)

(52) U.S. Cl. ...................... 29/596; 29/564.5; 29/602.1; 29/605; 29/606; 29/732; 29/735; 29/824; 29/838; 174/DIG. 20; 174/78; 310/12; 310/42

(58) Field of Classification Search ............... 29/596, 29/564.5, 602.1, 605, 606, 732, 735, 824, 29/838; 174/DIG. 20, 78; 310/12, 42
See application file for complete search history.

(56) References Cited

U.S. PATENT DOCUMENTS 4,557,038 A * 12/1985 Wcislo et al. ................ 29/596

(Continued)

FOREIGN PATENT DOCUMENTS

DE    28 27 150    10/1980

(Continued)

*Primary Examiner*—A. Dexter Tugbang
*Assistant Examiner*—Tim Phan
(74) *Attorney, Agent, or Firm*—McGlew & Tuttle, PC

(57) ABSTRACT

A device is provided for installing at least one linear motor line in the grooves (14) of an inductor (15) which is situated underneath a cover plate (10). The device includes a vehicle (31) which can be moved on the cover plate (10), a supply (34) of line (16), a device (36, 40) for forming the meander of the line (16), a device (35) for drawing the line (16) from the supply (34) and for delivering the line (16) to the device (36) and a tool (42) for pressing the line (16) into the grooves (14). The line may be installed automatically, even if the spacing of the grooves varies in dimension, by providing for an assembly slide (46) which can be moved in relation to the vehicle (31). The slide is located at least partially under the cover plate (10) and the device (36, 40) and tool (42) are located thereon. A measuring device (52) for measuring the position and the spacing (A) of the grooves (14) is also provided, as is a computer for processing the measuring data and for controlling the position of the assembly slide (46), the forming device (36, 40) and the tool (42). A corresponding method is also provided for installing at least one linear motor line.

13 Claims, 4 Drawing Sheets

U.S. PATENT DOCUMENTS

| | | | |
|---|---|---|---|
| 4,860,430 A | * | 8/1989 | Raschbichler et al. ........ 29/596 |
| 4,918,835 A | * | 4/1990 | Raschbichler et al. ........ 29/732 |
| 6,124,550 A | | 9/2000 | Funken et al. |
| 6,439,497 B1 | * | 8/2002 | Backlund et al. ........... 242/430 |

FOREIGN PATENT DOCUMENTS

| | | |
|---|---|---|
| DE | 37 37 719 | 5/1989 |
| DE | 196 20 222 | 3/1997 |

\* cited by examiner

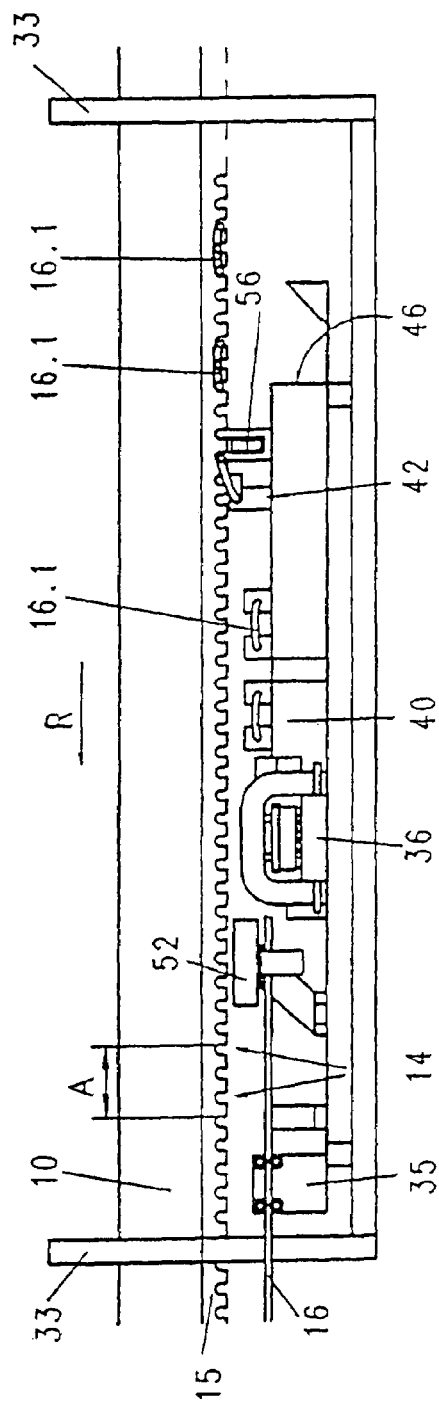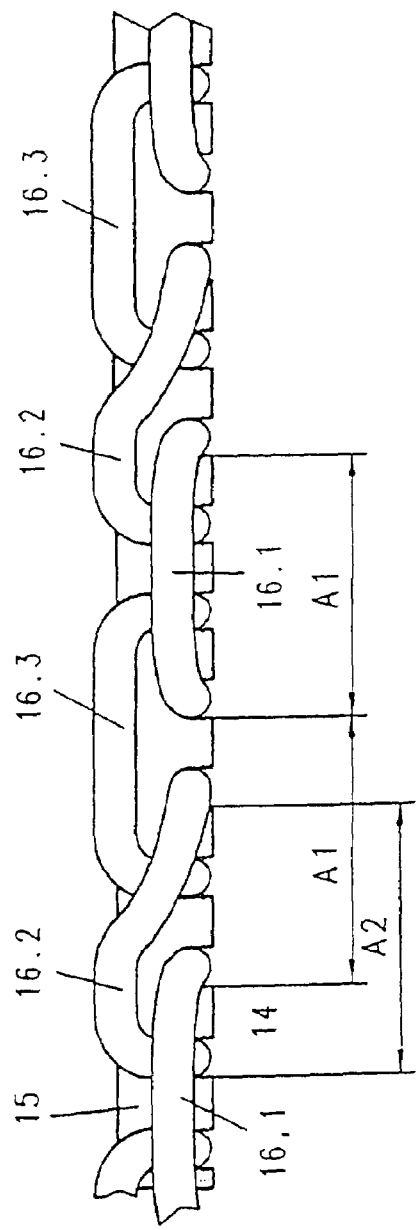

DEVICE FOR INSTALLING A LINEAR MOTOR LINE

CROSS REFERENCE TO RELATED DOCUMENT

The present application is a PCT National Phase application PCT/EP01/01254 that claims the benefit of the Germany Application 100 11 117.3 filed on Mar. 9, 2000 and which designated inter alia the United States and claims the benefit of the Germany Application 100 11 117.3 filed on Mar. 9, 2000.

FIELD OF THE INVENTION

The invention relates to a method and a device for installing a three-phase alternate current winding into the grooves of an extended inductor and/or into the inductor package of a linear motor which are affixed with downwardly open grooves at the underside of a cover plate of a track way.

BACKGROUND OF THE INVENTION

DE 3737 719 A2 describes a laying vehicle movable on the cover plate of the track ways and its working method. The work sequence is mainly comprised of the following steps:

The winding phases are pulled-off from a supply mounted on a vehicle and supplied to a bending device installed on the vehicle;
in the bending device, each winding phase is bent like a meander and in bent status brought into holders;
the holders are connected with each other on a strip at a fixed distance that corresponds to the groove spacing, and
the winding lying in the holders of the strip is guided via a jib to the underside of the cover plate and there pressed by a tool into the grooves of the inductor.

According to this method, the dimensions of the groove spacings and those of the winding geometry (meander forming) are firmly defined by the use of holders. This method does not allow for considering any tolerances or deviations in the meander dimensions.

However, tolerances or deviations do occur almost always. There are both tolerances in manufacture and tolerances at butt joints of the inductor packages or of the track way. Moreover, the grooves do not have constant distances in curved areas, because the groove spacings in the outer track are somewhat bigger than in the inner track. On the other hand, the groove spacings are constant within inductor packages if such packages are used, but to offset way differences greater inductor package spacings do occur in the outer track than in the inner track. Furthermore, there are changes in material due to weather impacts (thermal impacts) which entail deviations. Over long distances, these tolerances may add-up to noticeable differences in dimensions.

SUMMARY OF THE INVENTION

The technical problem to be solved by the invention is to provide a device and a method, which allow for an automatic laying, even if there are dimensional deviations in groove spacings.

According to the invention, a device is provided for laying at least one linear motor line into grooves of an inductor which is situated underneath a cover plate. The device includes a vehicle that can be moved on the cover plate, a supply of line, a device for forming the path or meander of the line, a device for drawing the line from the supply and for delivering the line to the device and a tool for pressing the line into the grooves. An assembly slide is provided that can be moved relative to the vehicle. The assembly slide is situated at least partly underneath the cover plate. The device and the tool are located on the assembly slide. A measuring device for measuring the position and spacings of grooves is provided. A computer is provided for processing measuring data and for controlling the position of the assembly slide, forming device, and tool.

The device is for laying at least one linear motor line into the grooves of an inductor and includes the vehicle that can be moved on the cover plate. As will be described yet in the following, the laying device is comprised of comprehensive technical setups so that it might be purposive to distribute modules of the laying device on several vehicles which can be moved as a train over the cover plate. Owing to the heavy weight of the technical material, it may also be expedient to equip the laying device B particularly concerning the line supply B with a facility that provides for an offset of the track way transverse inclination of the cover plate. To give an example for an inductor, reference is made to the description from DE 196 20 222 CI (see also U.S. Pat. No. 6,124,550).

The laying device is preferably comprised of a line supply, usually laid on a cable reel; a device for pulling-off the line and feeding the line to a forming device in which the line is bent and crimped to take the form of a meander; a tool for joining the meanders into the grooves; an assembly slide on which the forming device, the tool, and a measuring facility for measuring the groove spacings are accommodated, with the assembly slide being located at least partly under the track way and with it being possible to slide it relatively to the vehicle in longitudinal and transverse direction; a computer or a data processing and controlling facility to process measuring data and to control the position of the forming device, assembly slide and/or tool.

The most essential steps in the laying process B for one phase of the inductor B are comprised of the following ones: the laying device, hereinafter briefly referred to as a vehicle, moves preferably at a constant speed on the cover plate; the line is pulled-off continuously from the cable reel and passed over into the assembly slide; on the assembly slide, the groove spacings are measured by a measuring facility and these measured data are transmitted to the forming device; the bending device forms two bends of a meander in distinct cycles according to the defined dimensions; the two bends are taken-over by a crimping station and crimped, depending on the phase or groove position; from the crimping station, the meanders are taken-over by the indentation tool and pressed into the grooves.

The motion sequence of the assembly slide is comprised of a standstill in relation to the grooves and cover plate and of a motion preferably overtaking that of the vehicle, moving to the next position of indentation. During the standstill, the meanders are pressed into the grooves.

The laying procedure is repeated three times for each phase of the inductor at each side of the cover plate. For this purpose, the laying device may be comprised of one assembly slide with the associated equipment for each phase, so that the lines for all the three phases can be laid in a single pass. In a simpler version, the device is comprised of only one assembly slide so that the line of one phase only can be laid per pass.

The vehicle is comprised of a device (preferably a laser measuring system as an optoelectronic device) for measuring and transmitting the inductor groove spacings per phase; the measurement can be taken during a standstill or during a movement of the assembly slide. The measured groove spacings are transmitted to the bending device so that the meanders of the linear motor line can be formed in accordance with the measured data.

Furthermore, there is preferably a temperature-measuring device installed on the vehicle. The current temperature is transmitted to the data processing and controlling unit which thereby controls the bending device and/or the position of the slide, so that deviations in the measuring temperature from a defined design temperature are converted into modifying dimensions (plus or minus allowances) of the bending lengths of the meanders and transmitted.

The indentation tool is monitored via a power-way measurement and compared with a design curve (envelope curve) deposited in a computer. During indentation into the groove, an initial indentation resistance must be overcome, and after complete indentation, a growing resistance builds-up. Deviations from the power curve suggest that assembly has been faulty. The automatic assembly sequence is therefore specifically monitored at this critical point and interrupted if the power-monitoring device signalizes faulty sequences, which may lead to an impermissible deformation of the line.

An example for execution of this invention is outlined on the drawing. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWINGS

In the drawings:

FIG. 2 is a side view onto the assembly slide;

FIG. 3 is a side view onto the winding heads;

DESCRIPTION OF THE PREFERRED EMBODIMENT

Figure 5:
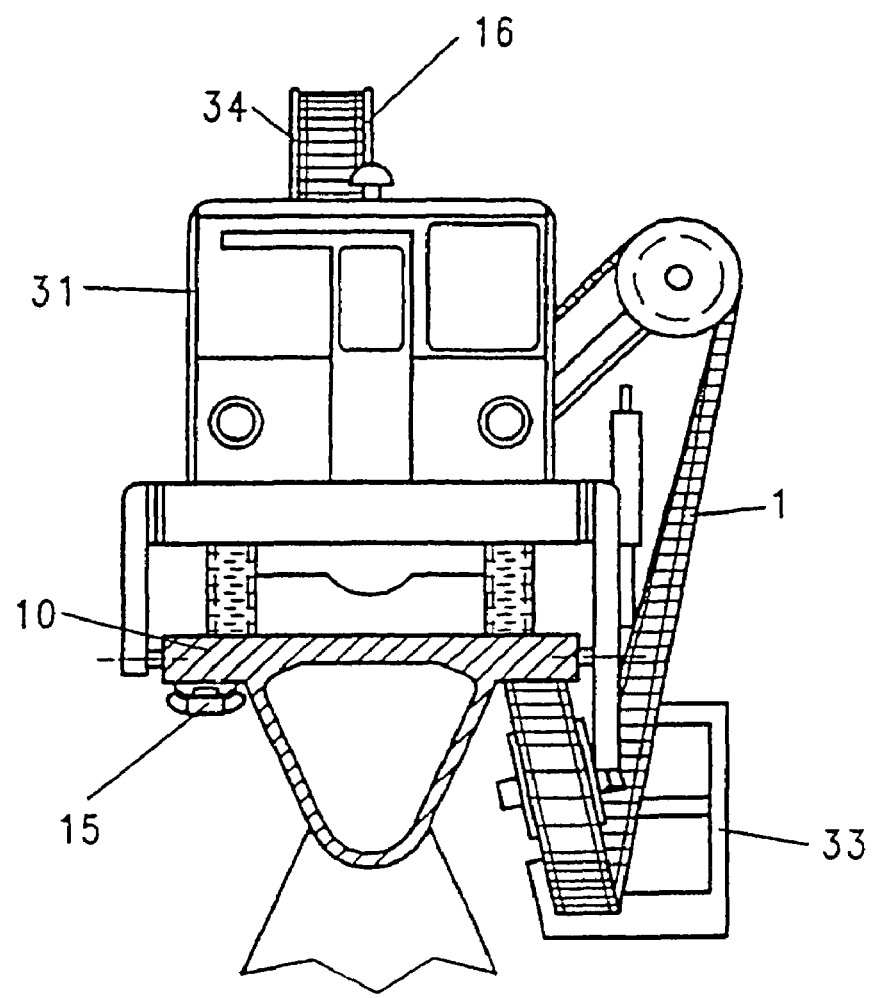
FIG. 5 is a front partially sectional view showing an arrangement according to the state of the art in technology

Referring to the drawings in particular, FIG. 5 shows a laying arrangement according to the state of the art in technology. One can see a laying vehicle 31 on the cover plate 10 of the track way. From a cable reel 34 the line is pulled-off and formed in the vehicle to meanders and brought into holders. The holders are connected with each other on strip 1 and guided via a jib 33 to the underside of the cover plate and mounted there with a tool in the inductor 15.

Figure 1A:
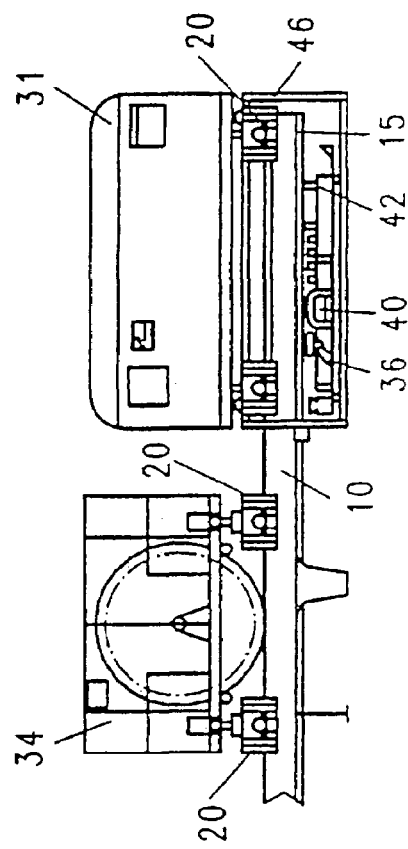
FIG. 1a is a side view showing an example of the invented laying device.
Figure 1B:
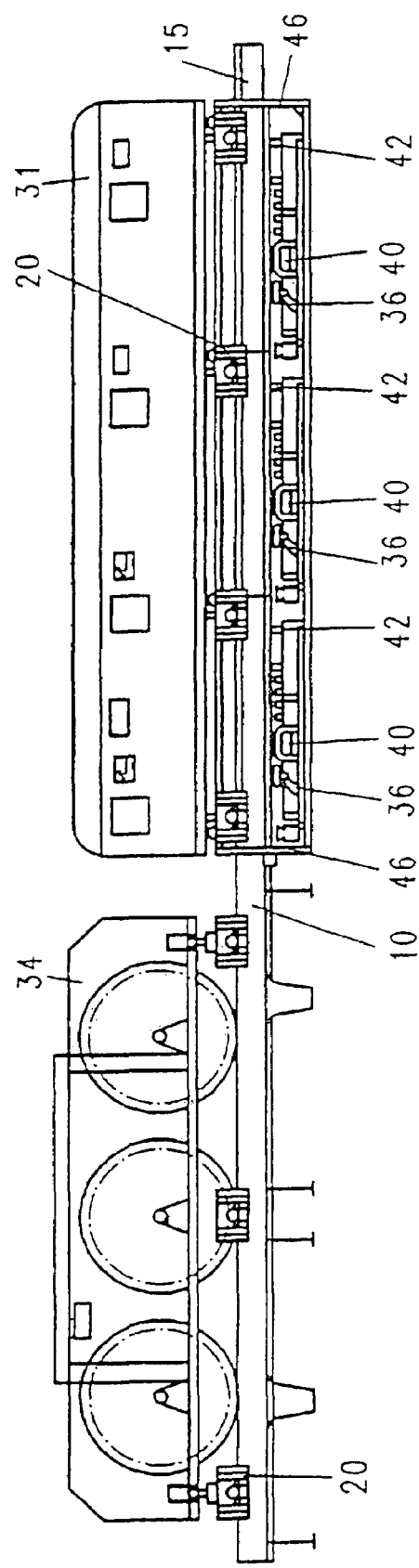
FIG. 1b is a side view showing an example of the invented laying devices

The present invention does not make use of holders mounted on a strip. Devices according to this invention are illustrated in a side view on FIGS. 1a and 1b. The difference between these two devices in FIGS. 1a and 1b consists in that the device illustrated in FIG. 1a is suitable for laying a line of one phase only, while the device illustrated in FIG. 1b can lay the lines of three phases in one pass. Apart from this difference, both devices have analogous features.

The device is comprised of a vehicle 31 which can be moved on the cover plate 10. Furthermore, a supply 34 for one and/or three lines 16 is provided for, with the supply 34 being configured each as a separate vehicle. The vehicle 31 and the supply 34 are comprised of appropriately configured guiding elements 20 to allow for a movement along cover plate 10. Thus the vehicle 31 and the supply 34 form a train that moves during laying along the cover plate 10.

Connected with the vehicle 31 is one assembly slide 46 each, which encompasses the cover plate 10 and which is partly located under the cover plate 10. Provided on the assembly slide 46 for each line 16 of one phase is a device 36, 40 to form the meanders of the line 16 and a tool 42 for indentation of the line 16 into the grooves 14. Furthermore, the assembly slide 46 accommodates a device 35 for pulling-off the line 16 from the supply 34 and for feeding the line 16 to the facility 35.

Figure 4:
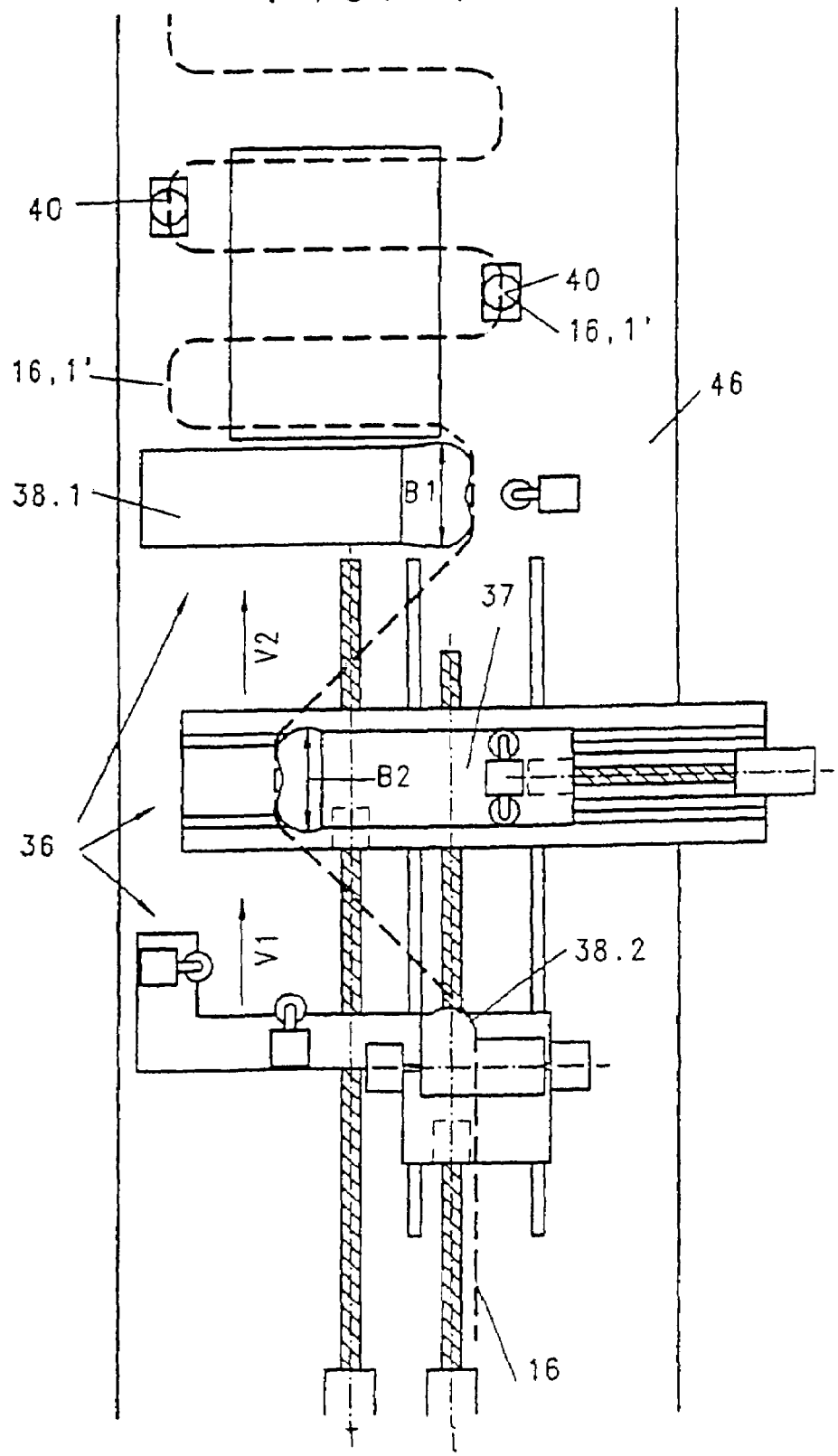
FIG. 4 is a view showing the bending device.

This situation is outlined in detail in a side view in FIG. 2. Under the track way 10, one can see the inductor 15 with the grooves 14. The line 16, coming from the left side, is introduced via a pull-off device 35 into the assembly module. The assembly module is located in a frame 33 which is affixed as a jib to the vehicle and which laterally encompasses the cover plate 10 of the track way. Accommodated in the assembly module, relatively to the vehicle or to the frame 33, is a mobile assembly slide 46. During assembly, the vehicle 31 moves in the direction of arrow R. The grooves 14 pertaining to one phase have a spacing A which is optically scanned by a laser-measuring device 52. With the measuring data of the groove spacings processed by a compute, two bends of the meander are bent in the bending device 36 (FIG. 4). In cycles, the two bends of the meander are passed on to the crimping station 40 where the winding heads 16.1 of the meanders are crimped. The crimping is explained more detailedly in the description of FIG. 3. Located at the end of the assembly slide 46 is the indentation station 42 by which the line 16 is pressed into the grooves 14. A power-way measuring station 56 monitors the indentation station 42. Furthermore, in this area a temperature measuring device and a computer may be provided; these are not illustrated in the figures.

With the illustrated assembly unit, one side of the inductor 15 each is equipped with the line meanders of one phase. For complete laying of the inductor, three phases of the line must be accommodated at both sides of the cover plate.

FIG. 3 shows the crimpings of the meanders. The crimpings are required because the winding heads 16.1, 16.2 and 16.3 cross each other. By laying the winding heads one above the other, the existing space can be filled here optimally. The meander (here 16.1) of a first phase of the inductor has no crimping, and in the second phase, only one winding head (here 16.2) is unilaterally bent-off in upward direction, and in the third phase both winding heads (here 16.3) are crimped in upward direction. The groove spacings of two phases are marked with the reference signs A1 and A2, with A1 and A2 representing the distances for the visible winding heads 16.1 and 16.2, and reference sign A1' constituting the distance of the relevant winding head on the backside of the inductor (arranged towards the inside of the cover plate).

FIG. 4 gives a schematic view of the bending device 36 in the assembly slide, viewed from the top. The axis of line 16 is represented by a dotted line. The line, coming from the left, is taken-over into the bending station 36 which is comprised of a bending ram 37 and two counter-bearings 38.1, 38.2. Prior to the bending procedure, the width B1, B2, of the bending ram 37 and of the first counter-bearing 38.1 is adjusted in conformity with the computerized input data. The widths B1, B2 correspond to the measuring data of the groove spacings A1, A2, corrected for plus or minus allowances for temperature. In accordance with the width sizes, the assembly slide is positioned according to the input data of the computer so that there is no lateral deviation when pressed into the grooves. During the bending procedure, in which the line is fixed at the stationary counter-bearing 38.1, the bending ram 37 carries-out two movements. It moves vertically to the track way and to the first counter-bearing 38.1 with its first speed v1. The second counter-bearing 38.2 moves simultaneously with the double speed v2 by recovering the line length to the first counter-bearing 38.1. The bent meanders are then taken-over in cycles by the crimping station 40 where the inner and outer winding head are crimped.

While specific embodiments of the invention have been shown and described in detail to illustrate the application of the principles of the invention, it will be understood that the invention may be embodied otherwise without departing from such principles.

What is claimed is:

1. A device for laying at least one linear motor line into the grooves of an inductor which is situated underneath a cover plate, the device comprising:
   a vehicle that can be moved on the cover plate;
   a supply of line;
   a line meander device for forming a meander of the line;
   a drawing device for drawing the line from said supply and for delivering the line to said line meander device;
   a tool for pressing the line into the grooves;
   an assembly slide which can be moved relative to the vehicle, said assembly slide being situated at least partly underneath the cover plate, said line meander device and said tool being located on said assembly slide;
   a measuring device for measuring the position and spacings of grooves; and
   a computer for processing measuring data and for controlling the position of the assembly slide, controlling the line meander device, and controlling the tool.

2. A device pursuant to claim 1, wherein the assembly slide can be moved in a longitudinal direction to the Vehicle.

3. A device pursuant to claim 1, wherein the line meandering device is comprised of a facility for forming the meanders of line and a facility for crimping winding heads.

4. A device according to claim 1, wherein the measuring device is an optoelectronic facility for measuring and transmitting the inductor groove spacings per phase.

5. A device according to claim 1, further comprising a power or way measuring facility for measuring the power or the way during indentation of the line into the grooves to compare power or way deviations against a standard design curve for possible faulty sequences, leading to line deformation.

6. A device according to claim 1, further comprising a temperature-measuring device.

7. A device for laying at least one linear motor line into the grooves of an inductor situated underneath a cover plate, the device comprising:
   a vehicle that is movable on the cover plate in a longitudinal direction of the vehicle;
   a supply of line;
   a drawing device for drawing the line from said supply and for delivering the line to a line meander device;
   an assembly slide situated at least partly underneath the cover plate which is movable relative to the vehicle in a transverse direction, said assembly slide including a meander device for forming a meander of the line and further comprising a line pressing tool for pressing the meander of the line into the grooves.

8. A device according to claim 7, wherein the assembly slide is movable in a longitudinal direction to the vehicle.

9. A device according to claim 7, wherein the line meandering device is comprised of a facility for forming the meanders of line and a facility for crimping winding heads.

10. A device according to claim 7, wherein the measuring device is an optoelectronic facility for measuring and transmitting the inductor groove spacings per phase.

11. A device according to claim 7, further comprising a power or way measuring facility for measuring the power or the way during indentation of the line into the grooves to compare power or way deviations against a standard design curve for possible faulty sequences, leading to line deformation.

12. A device according to claim 7, further comprising a temperature-measuring device.

13. A device for laying at least one linear motor line into the grooves of an inductor situated underneath a cover plate, the linear motor line to extend with portions directed in a longitudinal direction and portions directed in a transverse direction, the device comprising:
   a vehicle on the cover plate;
   a supply of line;
   a drawing device for drawing the line from said supply and for delivering the line to said line meander device;
   an assembly slide situated at least partly underneath the cover plate including means for moving relative to the vehicle in a transverse direction, said assembly slide further comprising a line meander device for forming a meander of the line including forming the portion directed in the longitudinal direction upon movement of the vehicle in the longitudinal direction and forming the portion directed in the transverse direction upon movement at the assembly slide in the transverse direction and having a line pressing tool for pressing the meander of the line into the grooves;
   a measuring device for measuring the position and spacings of grooves; and
   a computer for processing measuring data and for controlling the movement of the vehicle, movement of the assembly slide, line meander device and the line pressing tool.

* * * * *